United States Patent [19]

Blaschek et al.

[11] Patent Number: 5,081,666
[45] Date of Patent: Jan. 14, 1992

[54] METHOD FOR MEASURING THE BIT ERROR RATE IN THE TRANSMISSION OF DIGITAL INFORMATION

[75] Inventors: Emil-Franz Blaschek, Vienna, Austria; Werner Nagler, Hohenschaeftlarn, Fed. Rep. of Germany; Eckard Tiwald, Vienna, Austria

[73] Assignee: Siemens Aktiengesellschaft, Berlin and Munich, Fed. Rep. of Germany

[21] Appl. No.: 581,553

[22] Filed: Sep. 12, 1990

[30] Foreign Application Priority Data

Sep. 26, 1989 [EP] European Pat. Off. ........ 89117785.9

[51] Int. Cl.⁵ .................. H04M 3/26; H04B 3/46; H04B 17/00
[52] U.S. Cl. ................................ 379/5; 379/16; 371/20.5; 375/10
[58] Field of Search .................. 379/23, 16, 1, 5; 371/3, 5.1, 16.5, 20.1, 20.5; 375/10

[56] References Cited

U.S. PATENT DOCUMENTS 4,736,402 4/1988 Landis ........................ 379/16

Primary Examiner—Stafford D. Schreyer
Attorney, Agent, or Firm—Hill, Van Santen, Steadman & Simpson

[57] ABSTRACT

For generating test words that are sent across a test loop and are monitored at the receiving side for coincidence and with the corresponding, transmitted test word, a memory is read in which such test words that preferably correspond to test words generated by a pseudorandom generator are stored. In the course of the monitoring, the memory is read again under the same address as in the transmission, but delayed by the running time of the test loop, in order to supply the test word that is to be compared to the received test word.

3 Claims, 1 Drawing Sheet

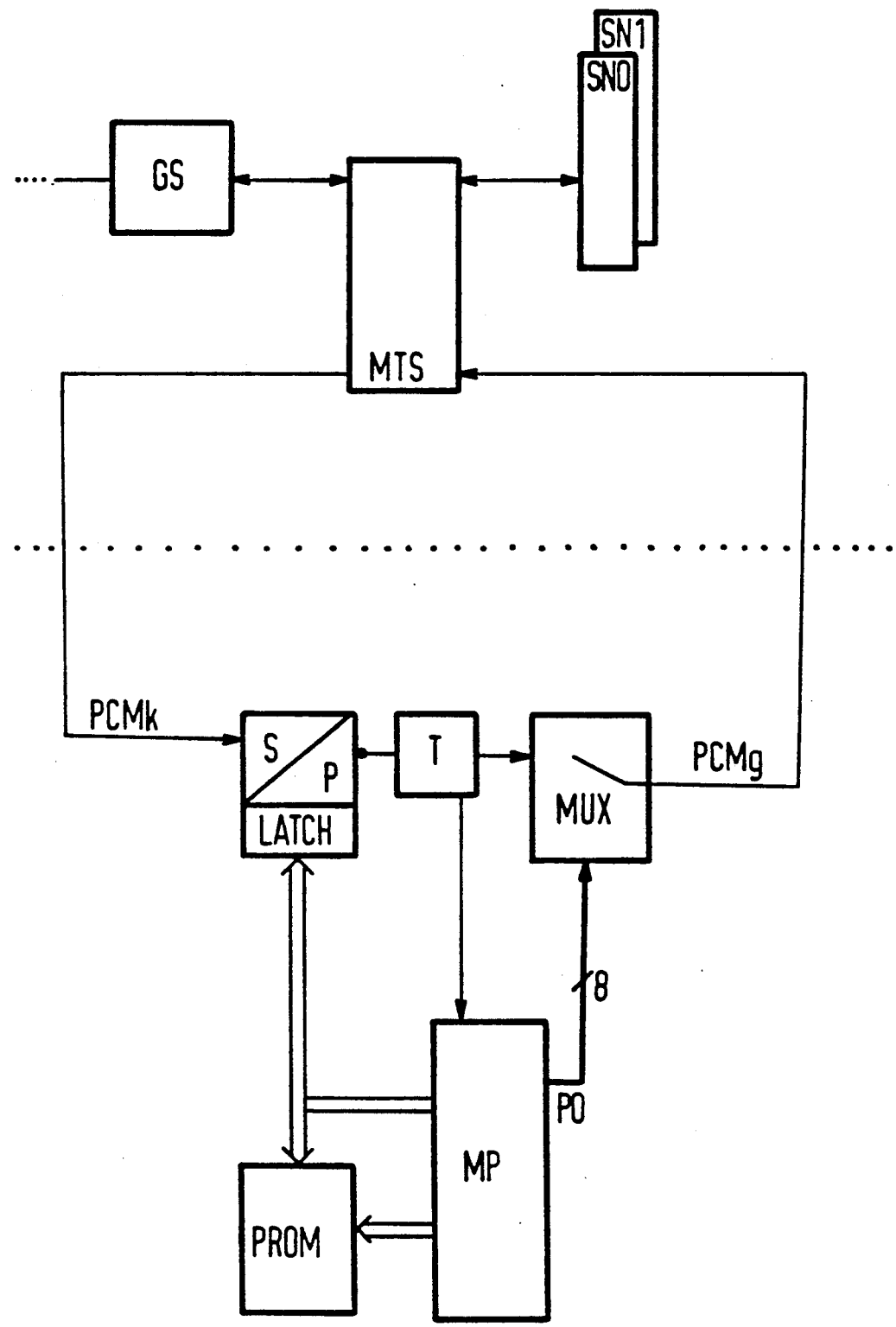

METHOD FOR MEASURING THE BIT ERROR RATE IN THE TRANSMISSION OF DIGITAL INFORMATION

BACKGROUND OF THE INVENTION

1. Field of the Invention

The present invention relates to a method for measuring the bit error rate in the transmission of digital information, particularly in conjunction with a telephone connection extending across a switching matrix network of a digital telephone switching center, in accordance wherewith a plurality of different digital test words are sent over the transmission or, respectively, connection section to be monitored and are transmitted back to the sending location after mirroring, a comparison with the respective, corresponding transmitted test word occurring thereat, in accordance wherewith, non-coincidences thereby identified are counted and the transgression of a prescribed plurality of such non-coincidences per unit of time is signaled.

2. Description of the Prior Art

The aforementioned different digital test words are generated with the assistance of a pseudo-random generator in practice in order to obtain a statement that is optimally-independent of the bit pattern of the test word.

In a known arrangement for the implementation of such a method, a second pseudo-random generator is present at the receiving location, the second pseudo-random generator having to be synchronized with the pseudo-random generator that generates the test words to be transmitted in order to compensate the running time between the sending location and the receiving location. When the generators are realized in the form of a feedback shift register, such a synchronization can occur in such a fashion that n of the received bits in the receiving pseudorandom generator are written in corresponding to the n stages of the shift register given an opened feedback loop, and, subsequently, the feedback loop is again closed. Insofar as the received bits have not been falsified on the transmission path, respectively identical bit patterns are generated by the transmitting and receiving pseudo-random generators in the spacing corresponding to the transmission running time. An additional monitoring logic must see to it that missynchronizations due to bit falsifications do not occur.

Such a hardware solution for the implementation of the method for measuring the bit error rate, however, is relatively involved and requires a correspondingly-large memory requirement.

SUMMARY OF THE INVENTION

The object of the present invention is to provide a method for measuring the bit error rate in the transmission of digital information that is more beneficial in comparison to that heretofore known.

The above object is achieved by a method of the type initially set forth that is characterized in that a read memory containing test words is read for sending such test words, and in that, in the course of the comparison, these test words are read again later by the respective running time required for the forward and return transmissions.

As a result of the concept of the present invention, a separate generator for generating test words is eliminated at the receiving side and, in addition, a greater flexibility is established since practically any arbitrary bit pattern can be stored for test words beyond test words of the type which would be supplied by a pseudo-random generator.

According to a further development and a particular feature of the invention, the executions in the implementation of the method of the invention are controlled by a micro-processor, in which case, the synchronization of the transmission of test words and the repeated generation of test words in conjunction with test words can also be realized with little expense in terms of hardware.

BRIEF DESCRIPTION OF THE DRAWING

Other objects, features and advantages of the invention, its organization, construction and operation will be best understood from the following detailed description, taken in conjunction with the accompanying drawings, on which there is a single FIGURE which is a schematic block circuit representation of an arrangement for implementing the method of the present invention.

DESCRIPTION OF THE PREFERRED EMBODIMENTS

The circuit parts required in conjunction with generating the test words and evaluating the test words are illustrated below a broken line on the drawing. A microprocessor MP as well as the appertaining program memory PROM are mentioned here first. A table is also contained in the program memory PROM and the various test words to be transmitted in conjunction with testing the bit error rate are stored in this table, these test words having a similar relationship to one another as the test words generated by a pseudo-random generator.

In the course of generating such test words, the table of the program memory PROM is read by the microprocessor MP at periodic intervals that correspond to the period of the time channel time intervals in which through-connections of telephone calls to be checked subsequently occur.

By way of an output PO of the microprocessor MP, these test words are transmitted to a multiplexer MUX in parallel form, are subjected to a parallel-to-series conversion therein and are then transmitted onto a multiplex line POMg that leads to a switching module MTS. The job of this switching module is to communicate these words into the time channel allocated to the connection to be tested and to the section of the connection to be tested.

As sections of the connection to be tested, the section of the link leading across a redundant, central switching matrix network SN0, SN1 or across a group coupler GS of a telephone switching center are indicated. Accordingly, a mirroring of the test words proceeding to these switching matrix networks occurs in the switching matrix networks, these test words being subsequently communicated by the switching module MTS onto a multiplex line PCMk that leads into a series-to-parallel converter S/P to which a register LATCH is allocated.

The series-to-parallel converter S/P as well as the aforementioned multiplexer MUX are supplied with clocks by a clock control T. The clock control T also supplies an interrupt signal to the microprocessor MP in the chronological spacing of the transmission periods of the test words that, for example, may be assumed to amount to 125 $\mu$s. The program that serves for the actual evaluation of the test words is started by this interrupt signal.

During the course of the evaluation, a defined test word is again read from the bit pattern table in the read-only memory PROM after the transmission of the specific test word corresponding to the running time across the connection to be tested and is compared to the test word that is received and deposited in the register LATCH. This comparison is likewise undertaken by the microprocessor MP.

Before the initial implementation of such a comparison, the running time is measured, to which end the specific bit pattern is first transmitted over a time interval that is longer than the greatest possible running time, this being done in order to produce defined relationships. A specific test word is then transmitted and the plurality of test pulse frames up to the arrival of this word in the register LATCH is identified. This operation is repeated with a further, specific test word and is then repeated again with the first-mentioned, specific test word. Insofar as a coincidence has been achieved in these three successive measurements of the running time, the following comparisons are based on the identified running time.

In the evaluation of the received test words, the non-coincidences thereby identified are added and deposited in a register. A respective comparison to an error threshold whose upward transgression leads to the output of an appropriate alarm is thereby also undertaken.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method for measuring the bit error rate in the transmission of digital information, particularly in conjunction with a telephone connection extending across a switching matrix network of a digital telephone switching center, and of the type in which the method includes transmitting a plurality of different digital test words over a telephone connection, receiving, mirroring and retransmitting the test words back over the telephone connection, receiving the retransmitted test words and comparing the same to the transmitted test words, identifying and counting the noncoincidences between the transmitted and received retransmitted test words, and signaling the transgression of a prescribed number of non-coincidences per time unit, the improvement comprising the steps of:

(a) storing the test words for transmission in a read-only memory;
   (b) during comparing, reading the respective test words at respective times delayed by the time required for the forward and return transmission; and
   (c) calculating the transit time with a separate measurement of the transit time before the actual measurement of the bit error rate.

2. The improved method of claim 1, and further comprising the step of:

(d) controlling the transmission, reading and comparison times with a microprocessor.

3. The improved method of claim 2, and further comprising the step of:

(e) synchronizing the operation of the microprocessor with a clock generator to chronological conditions on which the transmission and reception of the test words are based.

* * * * *